G. T. POLLARD AND O. H. JOHNSON.
DRUM FEEDER.
APPLICATION FILED AUG. 5, 1919.
1,422,618.
Patented July 11, 1922.
5 SHEETS—SHEET 1.
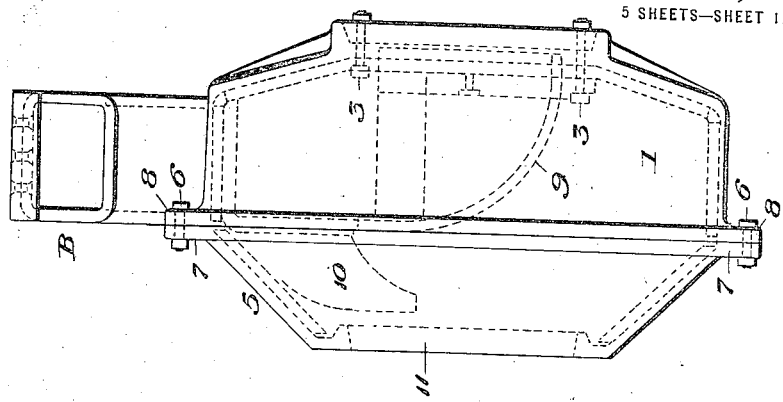
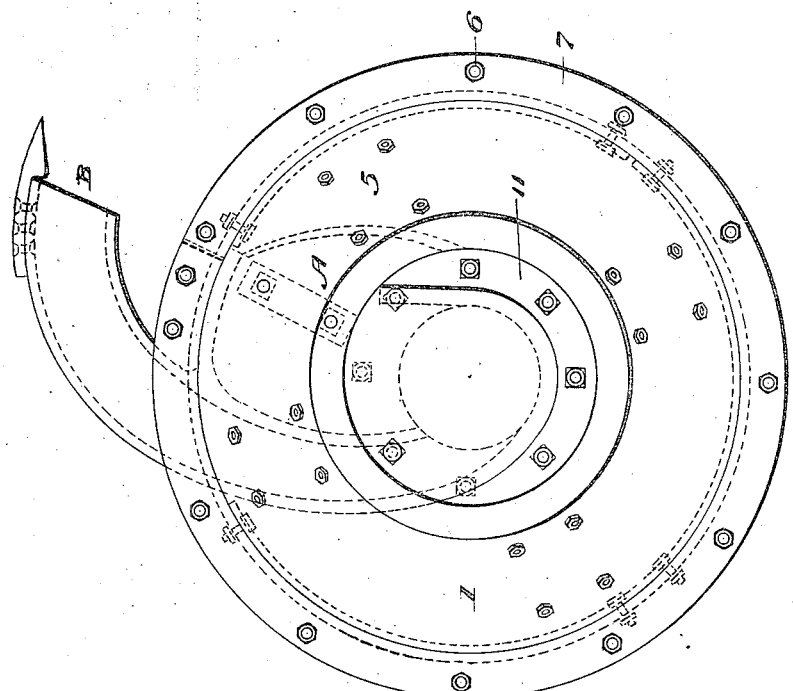

G. T. POLLARD AND O. H. JOHNSON.
DRUM FEEDER.
APPLICATION FILED AUG. 5, 1919.
1,422,618.
Patented July 11, 1922.
5 SHEETS—SHEET 2.
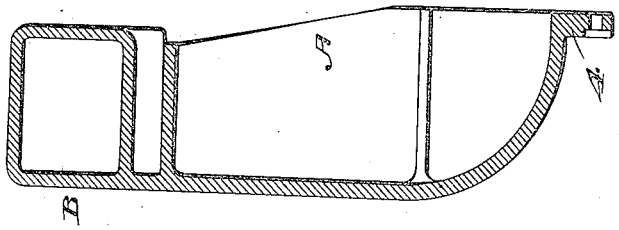
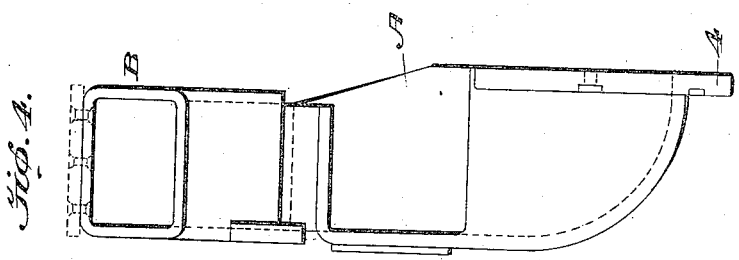
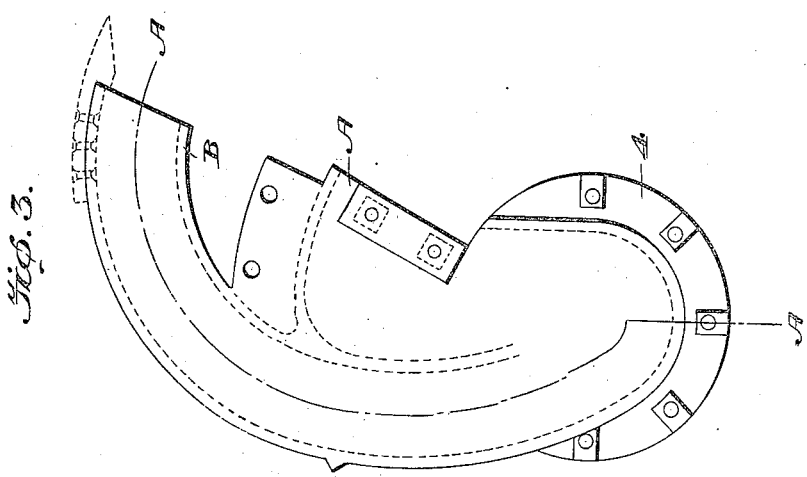
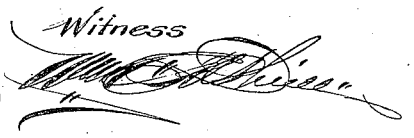

G. T. POLLARD AND O. H. JOHNSON.
DRUM FEEDER.
APPLICATION FILED AUG. 5, 1919.

1,422,618.

Patented July 11, 1922.
5 SHEETS—SHEET 3.

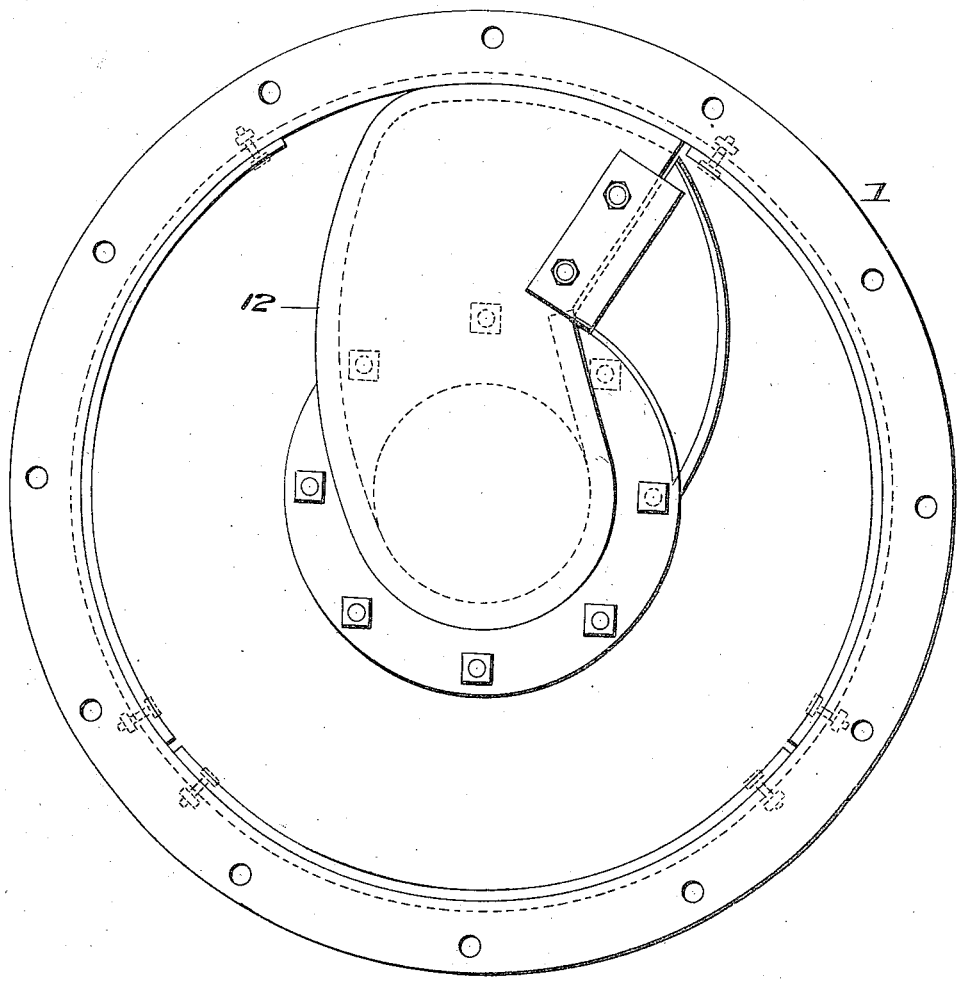

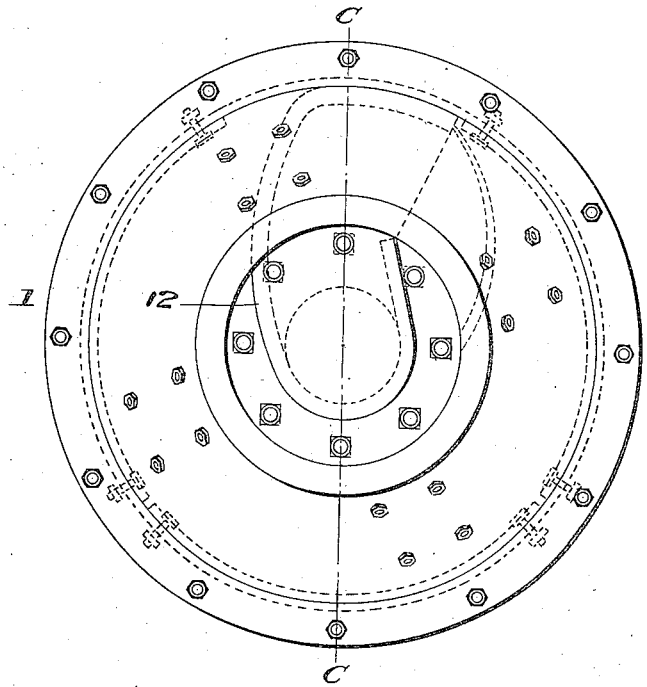
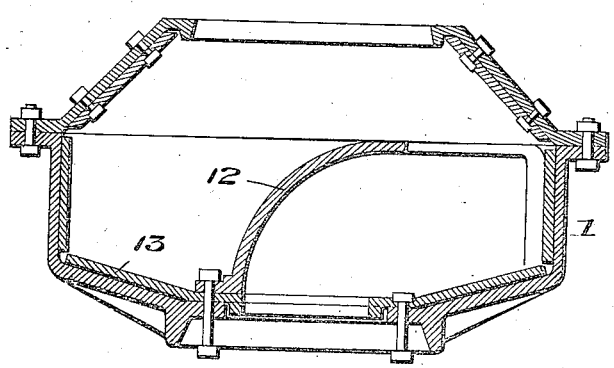

UNITED STATES PATENT OFFICE.

GURDON T. POLLARD AND OSCAR H. JOHNSON, OF DENVER, COLORADO, ASSIGNORS TO THE MINE & SMELTER SUPPLY COMPANY, OF DENVER, COLORADO, A CORPORATION OF COLORADO.

DRUM FEEDER.

1,422,618. Specification of Letters Patent. Patented July 11, 1922.

Application filed August 5, 1919. Serial No. 315,560.

*To all whom it may concern:*

Be it known that we, GURDON T. POLLARD and OSCAR H. JOHNSON, citizens of the United States residing at the city and county of Denver, and State of Colorado, have invented certain new and useful Improvements in Drum Feeders, of which the following is a specification.

This invention relates to an improvement in drum feeders.

The present invention is a reversible and convertible feeder of the rotary type, and it consists of a drum in which a combined primary and secondary feed scoop or a single internal feed scoop may be employed, thus making the feeder convertible as well as reversible, since the feeder without alteration of the construction of parts may be assembled to operate with either right or left-hand rotation.

Some of the objects are to provide a feeder in which time is saved in renewing the parts, and at the same time one which is cheaper to operate. Another object is to provide a feeder in which the scoops may be easily replaced. Another object is to provide a feeder which by removing one part permits inspection and accessibility to the other parts. Still another object is to provide a feeder wherein any desired change in radius or length of scoops may be obtained by simply a change of scoops without the change of other parts.

In the accompanying drawings:—

Fig. 1 is a view in front elevation of this improved feeder;

Fig. 2 is a view in side elevation;

Fig. 3 is a view in front elevation of the combined primary and secondary feed-scoop;

Fig. 4 is a side view of the same;

Fig. 5 is a section on the line A—A of Fig. 3;

Fig. 8 is a view looking into the feeder with the cone cover removed and showing a drumtype of the feeder with internal scoop only;

Fig. 9 is a similar view with the cone cover in position;

Fig. 10 is a section on line C—C of Fig. 9.

Figure 6:
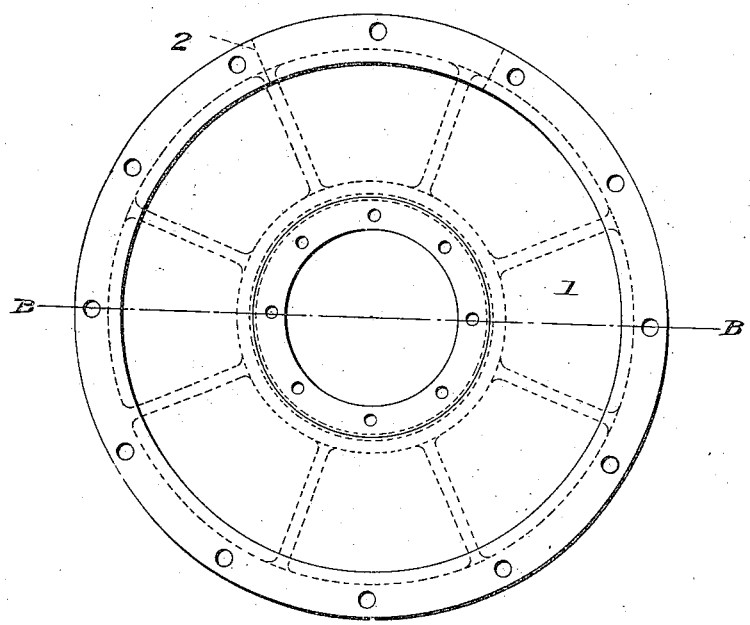
Fig. 6 is a view looking into the drum-feeder head.
Figure 7:
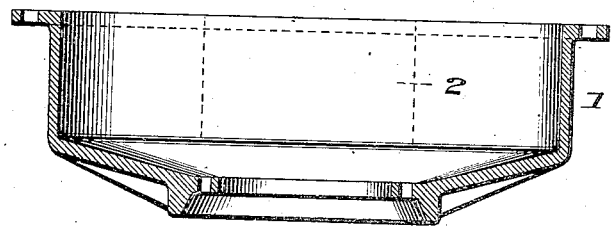
Fig. 7 is a horizozntal section on the line B—B of Fig. 6.

The letters A and B represent the internal and external scoops respectively, preferably made in a single casting, as shown in Figs. 3, 4 and 5, the internal or primary scoop being so proportioned and constructed that it occupies a position within the drum-head 1, whereas the external or secondary scoop B projects out through an opening 2 formed for it in the peripheral opening of the head shown in Figs. 6 and 7. This combined internal and external scoop is held rigidly in place in the drum feeder head by bolts 3 extending through holes in the hub 4 provided therefor, and the same are enclosed within the drum when the cone cover 5 is closed, which in turn is held in place by bolts 6 extending through the flanges 7 and 8 of the cover and drum-feeder head respectively.

These primary and secondary feeds are at all times kept separate by a partition 9 formed as an integral wall between the two, so that the material scooped does not become mixed within the drum feeder, and not until it reaches the trunnion into which it is delivered by the two scoops.

Assuming the drum has a charge of material taken in through the actual inlet 11, the internal scoop gathers the material which is within the drum, and the external scoop gathers material external of the drum, through the mouth B.

Both the internal and external scoops have an elbow formation as shown in Figs. 4 and 5, which materially facilitates the delivery of the material into the trunnion liner.

A collecting wing 10 on the edge of the internal scoop projects outwardly in the direction of the primary inlet 11, as shown in Fig. 2, to facilitate the feed into the internal scoop.

It is understood this feeder has the usual axial inlet as well as outlet opposite each other as is common to this type of feeder.

By making the combined internal and external scoops in both rights and lefts, the drum can be readily changed without other alteration to operate with either right-hand or left hand rotation, as the case may be.

In Figs. 8, 9 and 10, we show a type of drum-feeder having an internal scoop 12 only, this being an illustration of how, by simply changing the combined internal and external form, the scoop may be converted into an internal scoop feeder only. In other words, our invention contemplates conversion either into a simple drum feeder or an internal or external feeder, without the necessity of substituting a new drum. When used in this way, of course, the external opening 2 would be closed either by the outer end of the scoop, the shell liner 13, or, if need be, by an external plate secured thereover.

From the foregoing, it will be seen that a practical feeder is produced combining a primary and secondary feed-scoop in one, or making it possible to substitute a single scoop for the two; that by reason of the two scoops being combined as one, it is a simple matter to renew or provide for right and left hand rotation, and it provides a machine which is cheaper to operate than heretofore; it makes it easy to replace parts and also makes the parts accessible and easy to inspect; and furthermore it is possible in this machine to change the radius or length of scoops by providing different forms of scoops without the necessity of changing any of the other parts.

We claim:

1. In a rotary feeder, a combined internal and external scoop cast in a single piece with a partition between the two, so that the feeds therethrough are kept separate and distinct until they reach the outlets of the scoops.

2. The combination with a drum feeder comprising a drum feeder head and a cone cover adapted to be bolted together, of a scoop having its hub bolted at the hub or center of the drum feeder head and confined within the drum feeder head by the cone cover.

3. In a rotary feeder, the combination with a drum containing a drum feeder head and cone cover, the drum feeder head having a peripheral opening, of a combined internal and external scoop made in one piece and provided with a hub extending through said opening and having its hub secured to the hub of the drum feeder-head.

4. In a drum-feeder, the combination with a drum feeder head and cone cover secured thereto, of a scoop having its hub coincident with and secured to the hub of the drum feeder head, and provided with outwardly-extending collecting wing.

5. In a drum-feeder, the combination with a drum feeder head and cone cover, the drum-feeder head having a peripheral opening, of a combined internal and external scoop made in one and having a dividing partition therebetween which extends through the peripheral opening and is secured at its inner end within the drum.

6. In a rotary feeder provided with an outlet, and combined internal and external scoop cast in a single piece with a partition between the two, so that the feeds therethrough are kept separate and distinct until they reach the outlets of the scoops, which are in direct communication with the feeder outlet.

In testimony whereof we affix our signatures.

GURDON T. POLLARD.
OSCAR H. JOHNSON.